United States Patent [19]
Anderson

[11] Patent Number: 5,465,992
[45] Date of Patent: Nov. 14, 1995

[54] ALIGNING DEVICE FOR HITCHING A TOWED VEHICLE

[76] Inventor: Ronald G. Anderson, 3710 S.E. Hillside Dr., Milwaukie, Oreg. 97267

[21] Appl. No.: 351,936

[22] Filed: Dec. 8, 1994

[51] Int. Cl.⁶ .................................................. B60D 1/06
[52] U.S. Cl. .......................... 280/477; 280/511; 280/507
[58] Field of Search ................................. 280/477, 504, 280/511, 478.1

[56] References Cited

U.S. PATENT DOCUMENTS

| | | | |
|---|---|---|---|
| 3,765,703 | 10/1973 | Voelkerding et al. | 280/477 |
| 3,879,062 | 4/1975 | Miller | 280/477 |
| 4,416,466 | 11/1983 | Park | 280/477 |
| 4,840,392 | 6/1989 | Baskett | 280/477 |
| 4,844,496 | 7/1989 | Webb et al. | 280/477 |
| 4,854,604 | 8/1989 | Stallsworth | 280/477 |
| 4,871,185 | 10/1989 | Chakroff | 280/477 |
| 4,961,590 | 10/1990 | Davenport | 280/477 |
| 4,974,866 | 12/1990 | Morgan | 280/477 |
| 5,114,170 | 5/1992 | Lanni et al. | 280/477 |
| 5,236,215 | 8/1993 | Wylie | 280/477 |

*Primary Examiner*—Margaret A. Focarino
*Assistant Examiner*—Victor E. Johnson
*Attorney, Agent, or Firm*—Eugene M. Eckelman

[57] ABSTRACT

A base plate has an aperture which allows the plate to be mounted flatwise on a drawbar under the hitch ball. The base plate has a front integral wall of short height which allows side to side swinging movement of a trailer tongue over the top of it when the tongue is hitched to the ball. A flared trailer tongue guide is removably seated on the base plate in contact with the rear surface of the short front wall. The flared guide is locked in place by a pair of pivotal latch members having latch fingers that engage firmly against the bottom surface of the base plate. The aperture in the base plate is oblong to allow adjustment for the stop position of a trailer tongue as it bottoms out in the flared guide.

6 Claims, 2 Drawing Sheets

ALIGNING DEVICE FOR HITCHING A TOWED VEHICLE

BACKGROUND OF THE INVENTION

This invention relates to an aligning device for coupling a vehicle to a towing vehicle.

The typical method of coupling a trailer, such as a recreational vehicle, to a towing vehicle is laborious and time consuming. Many vehicles are very heavy and the towing tongue thereof cannot be lifted and otherwise manipulated by hand. The trailer usually has a jack stand that adjusts vertically for raising and lowering the tongue to position it for coupling and uncoupling. The alignment must therefore be accurate without any assistance which of course requires skill in aiming the ball hitch under the ball socket of the tongue. Also, since the vehicles to be towed are usually quite heavy, the towing vehicle must be backed up carefully to avoid damage by abutting forces against the drawbar hitch or the towing vehicle itself. These problems have been recognized and alignment devices have been proposed. For example U.S. Pat. No. 4,871,185 relates to an aligning guide that uses a V-shaped guide that is clamped between the ball and the drawbar by the ball fastener. The guide has vertical slidable spring-held male and female mating parts which allow removal when the hitching is completed or otherwise to be removed from the vehicle. This prior device also uses spring-held longitudinal positioning means for lateral and longitudinal positioning. The removal of the guide is an important feature but the spring-held vertically slidable male and female parts and the spring-held longitudinal positioning means provide a structure that can easily fail. For example, if the ball socket on the towed vehicle, and especially a heavy vehicle, should be substantially out of alignment when the towing is back up or the towing vehicle is moving too fast, the springs could be released to cause separation of or damage to parts of the aligning guide or damage to the towing vehicle. Other devices have been patented such as shown in U.S. Pat. Nos. 4,844,496, 4,854,604, 4,961,590, 4,974,866 and 5,236,215. While these devices do not incorporate spring devices subject to damage, they are not easily removable, some of them are overly complicated, and some are expensive to manufacture.

SUMMARY OF THE INVENTION

It is therefore a primary object of the invention to provide an aligning device which is simplified in structure, which is sturdy in use, which can be adapted to substantially any tow bar, and which has a guide portion thereof easily removable from the tow bar.

A particular object of the aligning device is its sturdy arrangement of parts wherein a removable guide portion thereof has a rugged fastening structure that cannot be released by accidental strong impact forces of the trailer tongue thereagainst or by misalignment of the trailer tongue with the guide.

A further object is to provide an aligning guide having a novel adjusting structure for longitudinal positioning of the ball socket over the ball.

In carrying out these objectives, the device comprises a base plate with an aperture disposed between the front and rear edges thereof. With this aperture, the base plate is capable of being bolted onto a drawbar between the ball and the drawbar. The base plate has an upstanding rib or short front wall. A flared trailer tongue aligning guide is arranged to be seated on its bottom edge on the base plate in abutting contact with the rear surface of the short front wall. This aligning guide is of sufficient height such that it will be an abutment for the trailer tongue when the latter is jacked up higher than the ball during the reverse hitching movement of the towing vehicle. Positive locking means are provided on the guide which comprise a vertical pivoted lever having a bottom transverse finger which in a bolted rotative position of the lever engages the bottom surface of the base plate and thus provides the positive lock of the guide on the base plate. The aperture in the base plate for receiving the ball stem is oblong with its longer dimension extending in a direction between the front and rear edges of the base plate and capable of short longitudinal positioning for adjusting the forward stopping abutment of the tongue against the guide and vertical alignment of the ball socket with the ball.

The invention will be better understood and additional objects and advantages will become apparent from the following description taken in connection with the accompanying drawings.

DETAILED DESCRIPTION OF A PREFERRED EMBODIMENT

Figure 1:
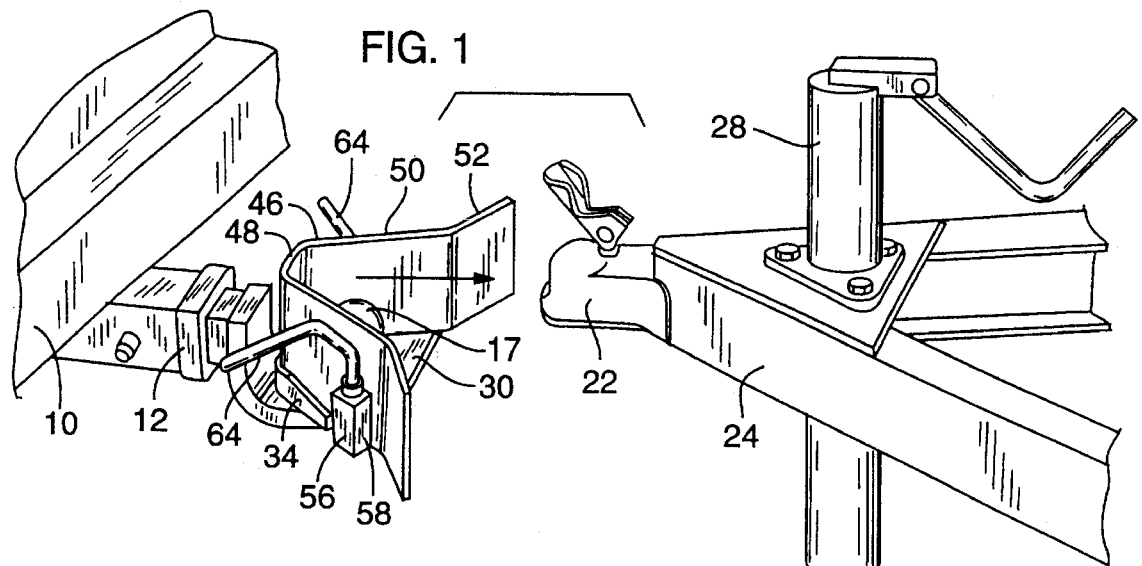
FIG. 1 is a perspective view of the present aligning device mounted on a towing vehicle, this view also showing the tongue of a vehicle to be towed in a process of hitching the two vehicles together.
Figure 2:
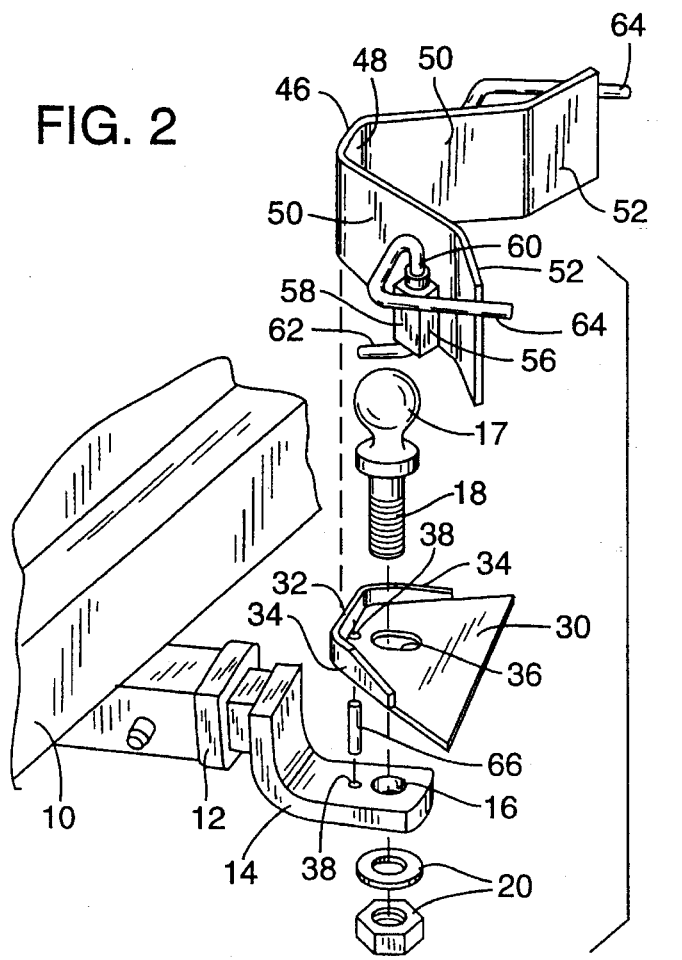
FIG. 2 is an exploded view of the present aligning device.
Figure 3:
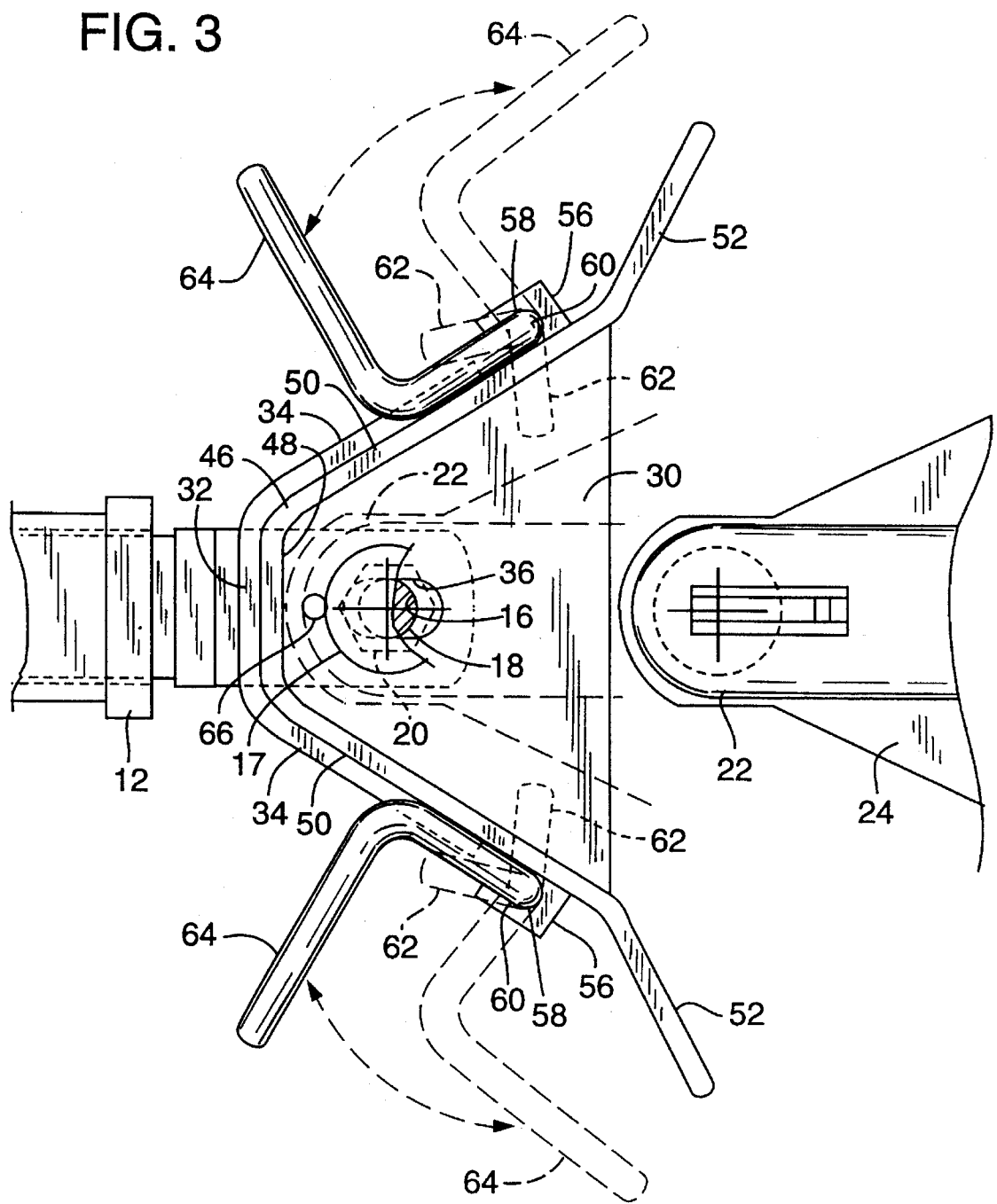
FIG. 3 is a top plan view of the device in association with a trailer tongue, the full lines of this view showing a latched condition of the towed vehicle and the removable aligning device and the broken lines showing unlatched position of the latching means for the aligning device.

With particular reference to the drawings, the reference numeral 10 designates a towing vehicle which carries a drawbar 12. The drawbar has suitable mounted support on the vehicle such as a socket mounting as shown, a bumper mounting, or otherwise. All of such drawbars include a horizontal support portion 14 having an aperture 16 for a hitch ball 17 which has a threaded stem 18 for mounting in the aperture 16 and which is clamped tight by underneath fastening means 20.

The hitch ball 17 is arranged for hitching attachment to a ball socket 22 of a tongue portion 24 of a vehicle to be towed. Tongue portion 24 has a jack stand structure 28 for adjusting the tongue up for a use position or down in trailering position.

According to the invention there is provided a base plate 30 which has a flared configuration in plan with the widening portion being toward the rear edge. A rib or vertically short wall integral with the base plate 30 extends across the front of the plate and has extensions 34 that lead rearwardly along the sides. These side in a U-shape in plan extensions terminate short of the rearward edge of the base plate. The base plate is secured to the drawbar portion 14 solely by a clamping engagement between the ball and the drawbar portion. The height of the rib 32 is such as to allow the tongue of a vehicle when attached to the ball to swing freely thereover from side to side. Thus, this base plate can remain in place when not being used in aligning functions.

The base plate has a laterally centered aperture 36 which has an oblong, such as elliptical, shape that has its greater length or major axis extending longitudinally of the base plate. This oblong aperture allows a short longitudinal adjustable engagement under the hitch ball 16. A small aperture 38 is provided in the base plate between the aperture 36 and the rib 32. The purpose of aperture 38 will be described hereinafter.

Forming a part of the present device is an aligning portion 46 which is generally U-shaped in plan, having a front substantially straight laterally extending wall 48 and flared side walls 50 which include obtuse angled rear end extensions 52. Extensions 52 widen the receiving area of the hitching device with a minimum of rear projection beyond the hitch support. The shape of the wall 48 together with a front portion of the walls 50 is the same shape as the walls 32 and 34 in an arrangement such that the aligning portion 46 can be seated on the plate 30 immediately behind and in contact with the walls 32 and 34.

The aligning portion 46 has integral side latch mechanisms 56. These latch mechanisms have an upright pivot support 58 for a latch bar 60. The latch bar has a bottom latch finger 62 extending angularly of the bar 60 in a horizontal direction. The bar 60 also has a crank type handle 64 that extends angularly in a direction substantially opposite from the latch finger 62. The latch mechanisms 56 are mounted on the aligning portion 46 at a point beyond the rear edge of the side extensions 34 of the rib 32 whereby to clear these extensions when the aligning portion 46 is seated on the base plate. By rotating the handle 64, the latching finger 62 can be swung under the bottom of the base plate 30 for latching the aligning portion or it can be swung out to the side for allowing disconnection of the latter from the base plate. The latch fingers 62 are arranged to tightly abut up against the bottom wall of the base plate whereby a firm hold-down connection is provided between the aligning portion 46 and the base plate.

In the use of the device, the base plate 30 is mounted under the ball and held in clamped position by the hitch ball 17. Clamping support of the base plate is generally sufficient to maintain the aligning portion 46 facing exactly rearwardly, but if desired, a countersunk set pin 66 can be mounted through the aperture 38 for engagement with a hole 66 that would be provided in the drawbar.

The aligning portion 46 abuts securely against the rib 32 on the front and the sides and thus provides a front abutment positive lock against any longitudinal play. Also, the latch fingers 62 engage firmly against the surface of the base plate and contribute to the positive unmovable abutment guiding walls for the trailer tongue. There are no spring held parts that can forcefully and accidentally become dislodged. The aligning portion 46 is readily removed by simply turning the crank handles 64 and lifting it off the base plate.

The front end of the ball socket mechanism 22 of the trailer tongue will engage the front wall 48 of the aligning portion 46 when it is vertically aligned with the ball. Such positioning can be adjusted by adjusting the base plate 30 under the ball in the oblong aperture 36. Once this adjustment has been made, the ball will be readily vertically aligned every time. If another trailer is to be hitched, alignment can readily be provided by adjusting the base plate 30 under the ball hitch 17.

It is to be understood that the form of my invention herein shown and described is to be taken as a preferred example of the same and that various other changes in the shape, size and arrangement of parts may be resorted to without departing from the spirit of my invention, or the scope of the subjoined claims.

Having thus described by invention, I claim:

1. An aligning device capable of use with a drawbar of a type that is mounted on a towing vehicle and arranged for hitching engagement with a ball socket on a tongue of a towed vehicle, the drawbar being of the type having a flat surface and a hitch ball with a threaded stem arranged to be bolted in a ball mounting aperture in the drawbar, said aligning device comprising:

a base plate having front and rear edges and top and bottom surfaces, an aperture in said base plate disposed between said front and rear edges, said base plate being capable of being removably bolted flatwise on said drawbar solely by the stem of a hitch ball upon alignment of said aperture in said base plate with the ball mounting aperture in the drawbar, an integral laterally extending U-shaped wall projecting upwardly from the front edge of said base plate and having a rearwardly facing wall surface, said U-shaped wall being of limited height for allowing side-to-side swinging movement of a trailer tongue over the top of said U-shaped wall, a trailer tongue guide having top and bottom edges, said tongue guide being U-shaped and facing the rear for guiding the ball socket of the tongue of a towed vehicle over a hitch ball of a towing vehicle into engagement with said front integral wall, said guide being arranged to be seated with said bottom edge thereof seated on the top surface of said base plate in contact with the rearwardly facing wall surface of said front wall for aligning the ball socket of a towed vehicle over the hitch ball of a towing vehicle, and locking means releasably locking said guide in place on said base plate, said locking means comprising a vertical pivoted lever having a bottom horizontal latch finger that extends at an angle from said pivoted lever whereby in a rotative position of the lever said finger engages against the bottom surface of said base plate in a clamping engagement.

2. The device of claim 1 wherein said aperture in said base plate is oblong with its major access extending in a direction between the front and rear edges of said base plate for adjusting the front to rear positioning of the base plate as bolted on the drawbar.

3. The device of claim 1 wherein said aperture in said base plate is elliptical having a major access extending in a direction between the front and rear edges of said base plate for adjusting the front to rear positioning of the base plate as bolted on the drawbar.

4. An aligning device capable of use with a drawbar of a type that is mounted on a towing vehicle and arranged for hitching engagement with a ball socket on a tongue of a towed vehicle, the drawbar being of the type having a flat surface and a hitch ball with a threaded stem arranged to be bolted in a ball mounting aperture in the drawbar, said aligning device comprising:

a base plate having front and rear edges and top and bottom surfaces, an aperture in said base plate disposed between said front and rear edges, said base plate being capable of being bolted flatwise on said drawbar by the stem of a hitch ball upon alignment of said aperture with the ball mounting aperture in the drawbar, a front integral wall on said base plate having a rearwardly facing wall surface, said front integral wall being of limited height for allowing side-to-side swinging movement of a trailer tongue over the top of said front integral wall, a flared trailer tongue guide means seated on said base plate and forming an elevated abutment for stopping a trailer tongue with its ball socket over the ball of the hitch, and rotatable locking means having a latch finger on a lower portion thereof releasably locking said guide in place on said base plate by rotative movement of said latch finger under the bottom surface of said base said base plate having adjustment means for making it adjustable in a front to rear positioning thereof on the drawbar to select the stop positioning of a trailer tongue relative to the ball of the hitch during connection of a trailer.

5. An aligning device capable of use with a drawbar of a type that is mounted on a towing vehicle and arranged for hitching engagement with a ball socket on a tongue of a towed vehicle, the drawbar being of the type having a flat surface and a hitch ball with a threaded stem arranged to be bolted in a ball mounting aperture in the drawbar, said aligning device comprising:

a base plate having front and rear edges and top and bottom surfaces, an aperture in said base plate disposed between said front and rear edges, said base plate being capable of being bolted flatwise on the drawbar by the stem of a hitch ball upon alignment of said aperture in said base plate with the ball mounting aperture in the drawbar, an integral wall projecting upwardly from the front edge of said base plate and having a rearwardly facing wall surface, said integral wall being of limited height for allowing side-to-side swinging movement of a trailer tongue over the top of said integral wall, a flared trailer tongue guide having top and bottom edges, said guide being arranged to be seated with said bottom edge thereof seated on said base plate in contact with the rearwardly facing surface of said integral wall, and locking means releasably locking said guide in place on said base plate, said locking means comprising a vertical pivoted body member, a latch finger leading angularly and horizontally from a bottom portion of said body member in one direction whereby in a rotated position of the lever said finger engages against the bottom surface of said base plate in a clamping engagement, and a handle leading angularly and horizontally from a top portion of said body member in a direction opposite from said latch finger.

6. The aligning device of claim 5 wherein said pivoted lever includes an angular extension at the top portion of said lever between said body member and said handle that forms a crank-type lever for manual rotative movements of said locking means.

* * * * *